United States Patent [19]

Schmida

[11] 4,238,015
[45] Dec. 9, 1980

[54] TEMPERATURE RESPONSIVE VISCOUS FAN DRIVE

[75] Inventor: Lawrence F. Schmida, Williamston, Mich.

[73] Assignee: Eaton Corporation, Cleveland, Ohio

[21] Appl. No.: 904,180

[22] Filed: May 8, 1978

[51] Int. Cl.³ .................... F16D 33/08; F16D 35/00
[52] U.S. Cl. ............................ 192/58 B; 192/82 T
[58] Field of Search ...................... 192/58 B, 82 T

[56] References Cited

U.S. PATENT DOCUMENTS

| | | | |
|---|---|---|---|
| 3,194,372 | 7/1965 | Weir | 192/58 |
| 3,259,221 | 7/1966 | Godfrey | 192/58 B |
| 3,272,293 | 9/1966 | Heater | 192/58 B |
| 3,463,282 | 8/1969 | Fujita et al. | 192/58 B |
| 3,648,811 | 3/1972 | La Flame | 192/58 B |
| 3,741,359 | 6/1973 | Leichliter | 192/58 B |
| 3,990,556 | 11/1976 | Hayashi et al. | 192/58 B |
| 4,046,239 | 9/1977 | Tinholt | 192/58 B |
| 4,086,988 | 5/1978 | Spence | 192/58 B |
| 4,086,989 | 5/1978 | Spence | 192/58 B |
| 4,132,299 | 1/1979 | Rohrer et al. | 192/58 B |

FOREIGN PATENT DOCUMENTS 841703 7/1960 United Kingdom ................ 192/58 B

Primary Examiner—Rodney H. Bonck
Attorney, Agent, or Firm—R. J. McCloskey; J. Yakimow

[57] ABSTRACT

Temperature responsive viscous fan drive having a reduced pump-out time. A pair of diametrically opposed notches opening radially outwardly are provided on the outer peripheral surface of the clutch member of the drive. The notches extend parallel to the axis of rotation of the clutch member between the sides thereof. An impeller element secured to the housing member of the drive is aligned with the notches and located adjacent one side of the clutch member to pump fluid from the operating chamber into the storage chamber. The outer peripheral surface of the clutch member is relatively close to the inner peripheral surface of the housing member.

7 Claims, 2 Drawing Figures

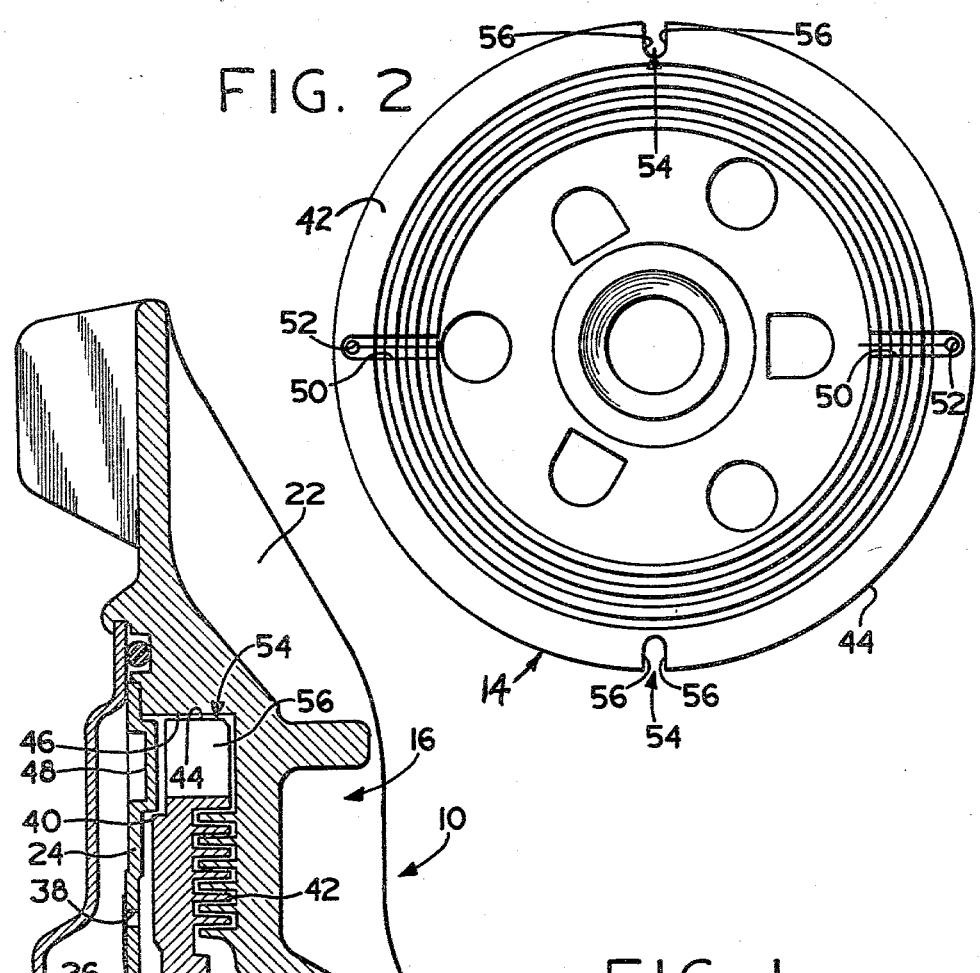
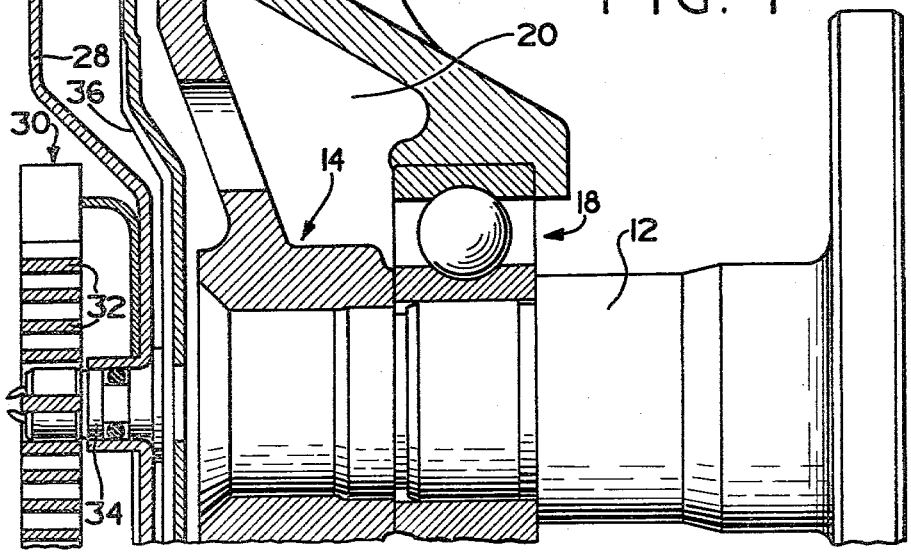

TEMPERATURE RESPONSIVE VISCOUS FAN DRIVE

Temperature responsive viscous drives have been used for years to drive fans on vehicles. A drive has a disengaged condition in which the fan is rotated at a relatively low angular velocity and an engaged condition at which the angular velocity is relatively high. When such drives are left in a nonoperating vehicle for a period of time, part of the fluid drains from the storage to the operating chamber of the drive. Upon start-up of the vehicle's engine, it is desirable to have all of the fluid pumped out of the operating chamber as soon as possible in order to reduce the fan speed and, accordingly, the noise created by the fan.

Accordingly, it is an object of the present invention to reduce the pump-out time of a temperature responsive viscous drive.

It is a further object of the invention to accomplish such reduction in pump-out time without substantial effect upon any other operational characteristics of the drive.

The foregoing objects have been accomplished by providing a pair of diametrically opposed notches on the outer periphery of the clutch member that are parallel to the axis of rotation of the drive.

FIG. 1 is a fragmentary side elevational view in section of a viscous drive according to the invention.

FIG. 2 is a front plan view of the entire clutch member of FIG. 1.

FIG. 1 illustrates a temperature responsive viscous fan drive 10 having an input shaft 12 which may be secured to an engine of a vehicle. A clutch member 14 is rigidly secured to one end of shaft 12 and rotatably supports a housing member 16 via a bearing 18. An operating chamber 20 is defined by the casting 22 and valve plate 24 of housing member 16 and by clutch member 14. A storage chamber 26 is provided adjacent operating chamber 20 and is defined by a cover plate 28 and valve plate 24 of housing member 16. Valve means 30 in the form of a bimetallic coil 32 secured to a valve arm 36 via a shaft 34 provided to cover and uncover an opening 38 defined in valve plate 24. Opening 38 provides fluid communication between storage chamber 26 and operating chamber 20. Bimetallic coil 32 is responsive to temperature changes to move valve arm 36. Viscous silicon fluid (not illustrated) is provided in storage chamber 26 and is allowed to flow into operating chamber 20 via opening 38 to effect the transmission of energy from the driving clutch member 14 to the driven housing member 16. In operation, a fan (not illustrated) is secured to casting 22 for the purpose of cooling the radiator of the vehicle.

Clutch member 14 includes a pair of axially spaced generally radially extending annular surfaces 40 and 42. Surface 42 has a plurality of annular lands and grooves that are interdigitated with mating lands and grooves on casting 22. Clutch member 14 is further defined by an annular axially extending outer peripheral surface 44 which is radially spaced from an annular peripheral surface 46 on casting 22.

Pump means in the form of an impeller element 48 carried by valve plate 25 protrudes into operating chamber 20 and is closely spaced from surface 40 of clutch member 14 near outer peripheral surface 44. An opening (not illustrated) adjacent element 48 is provided between operating chamber 20 and storage chamber 26. Upon rotation of clutch member 14 relative to housing member 16, viscous fluid in operating chamber 20 is impinged against element 48 and is directed through the opening from operating chamber 20 into storage chamber 26.

Clutch member 14 further include a pair of diametrically opposed radially extending grooves 50 projecting through the lands and grooves on surface 42. Grooves 50 terminate in openings 52 which extend through clutch member 14 from surface 42 to surface 40. Openings 52 open into surface 40 of clutch member 14 adjacent the radial location of element 48.

The foregoing describes a temperature responsive viscous fan drive which is currently being sold for use on automobiles—mainly those produced in the United States of America. Further details of the operation of such a drive may be acquired by reading U.S. Pat. Nos. 3,055,473 and 3,272,292.

In the preferred embodiment, the invention is directed toward a pair of diametrically opposed notches 54 in clutch member 14 having sides 56 which are parallel to the axis of rotation of shaft 12. Notches 54 open radially outwardly toward annular surface 46 of housing member 16 and extend between radially extending annular surfaces 40 and 42 of clutch member 14. The notches are located to be aligned with element 48 as illustrated in FIG. 1. It has been determined by applicant that the existence of notches 54 reduces the pump-out time of the viscous fluid from operating chamber 20 to storage chamber 26.

A series of tests have been run on viscous fan drives. The first series of drives tested will be referred to as standard drives having no notches 54. Reference to modified drives will be to drives having basically the same dimensions as the standard drives but also including two notches 54. In the tests, notches 54 were approximately one-eighth of an inch wide and three-sixteenths of an inch deep. The housing members 16 had an outside diameter of approximately seven and one-quarter inches. Clutch members 14 had an outside diameter of approximately four and one-eighth inches. The distance from the outer peripheral surface 44 to the first groove on surface 42 was approximately five-sixteenth of an inch. The lands and groove area of the drives were approximately five-eighths of an inch and contained approximately five lands and grooves as illustrated in FIG. 1. The remaining positions of the drives 10 were substantially as indicated in the drawings.

A fan was secured to the housing member of each of the drives. In the tests, a series of standard and modified drives were rotated from zero input rpm to 1600 rpm. A second set of tests included rotating the same drives from zero input rpm to 1850 rpm. The time to achieve the maximum revolution per minute of the input shafts in each test was approximately three seconds. Each drive had a standard amount of viscous fluid which, during engaged operation, would normally fill the operating chamber from inner peripheral surface 46 to the bottom of the land and groove area on radial surface 42. Upon initial rotation of each stationary drive, the viscous fluid was equally distributed between operating chamber 20 and storage chamber 26 so that the height of the fluid in each of the chambers was approximately the same.

For the standard drives in the zero to 1600 rpm test, the time in seconds for the fan speed to drop below 1000 rpm was from 19 to 114 seconds with a mean value of 45.8 seconds. For the modified drives in the same tests the comparable times were 5 to 53 seconds with a mean value of 18 seconds. In the zero to 1850 rpm test, the times for the standard drives for the fan speed to drop below 1000 rpm was from 7 to 33 seconds with a mean value of 17.9 seconds. In the similar zero to 1850 rpm tests using modified drives, the comparable times were 3 to 17 seconds with a mean value of 8.4 seconds. Fourteen standard drives were tested while 52 modified drives were tested. It can readily be seen from the foregoing figures that improvements from 53 to 61 percent were achieved in the mean value times of the tests.

No changes were noted in either the peak rpm or the minimum idle rpm between the standard and modified drives that were tested. Both the standard and modified drives were tested with viscous silicone fluid having approximately the same viscosity—4000 to 6000 centistoke. The OD clearance between surfaces 44 and 46 in both the standard and modified drives was approximately one-sixty-fourth of an inch. The test fan absorbed torques in the four to five foot pound range when driven by housing member 16 at approximately 2000 rpm. It is important, in order not to change other characteristics of the drives, that the notches are parallel to the axis of rotation of the clutch members.

It has been determined by applicant in other tests that similar improvements in pump-out time can be achieved on other viscous drive designs. It is, however, believed that as the input speed to shaft 12 is increased into the 5000 to 6000 rpm input range that problems may be encountered with high speed pump-out thus dropping the peak speed. Therefore, the invention seems to be best suited for viscous fan drives having an input to the clutch member of less than 4500 rpm.

What is claimed is:

1. A viscous drive comprising: a housing member having an annular peripheral surface; a clutch member rotatable relative to the housing member and disposed within the housing member to define an operating chamber, the clutch member having a pair of axially spaced generally radially extending annular surfaces and an outer peripheral surface spaced from the peripheral surface of the housing member; a fluid storage chamber separate from and adjacent to the operating chamber; an opening between the operating chamber and the storage chamber for providing fluid flow communications between the chambers, the opening being carried by the housing member; valve means effecting selective fluid communication via the opening between the storage chamber and the operating chamber temperature responsive means controlling the valve means; fluid disposed within the storage chamber and being selectively displaced into the operating chamber when the valve means is in a fluid communication position whereby the fluid is positioned in the operating chamber to transmit energy via the fluid from one of the members to the other of the members; pump means comprising an impeller element carried by one of the members in the operating chamber and being effective to pump fluid from the operating chamber to the storage chamber, the impeller element being located radially outwardly from the rotational axis substantially along the outer periphery of the clutch member; and a notch for improving pump-out time in the peripheral surface of one of the members extending parallel to the axis between the axially spaced surfaces of the clutch member and opening radially toward the peripheral surface of the other member.

2. A viscous drive according to claim 1 further comprising another notch in the peripheral surface of said one of the members extending parallel to the axis between the axially spaced surfaces of the clutch member and opening radially toward the peripheral surface of the other member, the one notch and the other notch being in the neighborhood of 180 degrees apart from one another on said peripheral surface.

3. A viscous drive according to claim 1 or 2 wherein the notch(s) are located in the clutch member.

4. A viscous drive according to claim 3 wherein the clutch member has an outside diameter of approximately four inches.

5. A viscous drive according to claim 3 wherein the clutch member has an outside diameter of approximately four inches and the notch(s) are approximately one-eighth on an inch wide and three-sixteenths of an inch deep.

6. A viscous drive according to claim 5 further comprising a fan secured to the drive that is configured to absorb approximately four to five foot pounds of torque when rotated at 2000 rpm and wherein the fluid has a viscosity of approximately 4000 to 6000 centistoke.

7. A viscous drive according to claim 3 wherein the peripheral surfaces are spaced radially from one another at a distance of approximately one-sixty-fourth of an inch in order that rotation of one of the members relative to the other of the members will result in the transfer of some energy between the members via the fluid in contact with the peripheral surfaces.

* * * * *